UNITED STATES PATENT OFFICE.

ARTHUR C. EATON, OF ROCKLAND, MAINE, AND WILLIAM R. CAMERON, OF MAMARONECK, NEW YORK, ASSIGNORS, BY MESNE ASSIGNMENTS, TO DEEP SEA FISHERIES, INC., A CORPORATION OF MAINE.

METHOD OF TREATING FISH.

1,404,352.  Specification of Letters Patent.  Patented Jan. 24, 1922.

No Drawing.  Application filed September 23, 1920.  Serial No. 412,289.

*To all whom it may concern:*

Be it known that we, ARTHUR C. EATON, citizen of the United States, and resident of Rockland, county of Knox, and State of Maine, and WILLIAM R. CAMERON, citizen of Canada, and resident of Mamaroneck, in the State of New York, have invented an Improvement in Methods of Treating Fish, of which the following is a specification.

The present invention relates to a method of treating fish, one object being to preserve the fish for a relatively long period in a condition closely approximating that of freshly caught fish and to prevent and arrest bacterial activity by subjecting the fish to low temperatures and by removing from their surfaces adhering particles of proteid and other matter capable of decomposition at ordinary temperatures.

The purpose in view is particularly important in the fresh fish trade where the consumer requires a commodity which shall be not only in prime fresh condition but which shall also be clean and pleasing in appearance.

Among the methods heretofore commonly used is one in which the fish are frozen as soon as possible after they are caught. They are then transported in the frozen condition to the various points of consumption. Another method involves the use of ice in direct contact with the fish but without freezing the meat. The method of using ice materially injures the appearance of the fish. Freezing has the disadvantage, that in thawing for use the fish are soaked in water which no doubt extracts some of the flavor of the fish giving the characteristic flat flavor of frozen fish.

The waste and expense involved in these methods make them undesirable both from the viewpoint of the dealer and the consumer.

According to the present invention, the freshly caught fish are preferably cleaned before treatment, that is, the viscera are removed. The cleaned fish are immersed in a moving bath or current of 80% saturated sodium chloride solution or approximately 19° Baumé, having a temperature preferably between 12° F. and 15° F. By means of the flowing bath the particles of blood, meat and the like, and other albuminous substances occurring on surfaces of the fish, are washed off and the subsurface temperature of the fish may be reduced to about 27°–28° F. and the interior temperature to 34° F. in about twenty to thirty minutes where the average weight of the fish is 4 lbs. This temperature has been found to keep the fish firm and fresh for many days, particularly when this temperature is substantially maintained or equalized by packing the fish in suitable insulating enclosures such as wooden boxes or individually in paper wrappers or the like.

Where it is desired to operate the chilling and cleansing bath continuously, the waste matter may be removed by any suitable means after which the purified brine or solution is returned to the bath. In practice, it has been found convenient to pump the fouled brine continuously from the washing and chilling tank after which the temperature of the brine is raised to approximately 150° F. At this point the greater portion of the suspended and dissolved proteids are coagulated and thrown out of solution and may conveniently be removed by filtering, to this extent purifying the brine. By again reducing the temperature of the brine to the required degree it may be re-introduced into the chilling and washing bath.

In practicing the method described, it has been found possible to preserve fresh fish in insulating containers in prime condition for fifteen days after treatment. Moreover, the fish so treated and insulated are firm to the touch and attractive in appearance since they respond in a remarkable degree to the tests for freshness usually applied to foodstuffs of this kind.

On the side of production it has been found that the method described materially reduces the cost of operation since a given quantity of ice used to reduce the temperature of the sodium chloride solution will chill more fish than the same quantity applied directly. Obviously, a refrigerating coil may be used instead of ice, thus eliminating entirely the expense of producing or shipping ice.

We claim:

1. The method of chilling fish to preserve them in prime fresh condition which includes immersing fresh fish in a flowing salt solution of such temperature and density that fish at an average temperature of 38°

F. and averaging four pounds in weight will attain a subsurface temperature of 27° F. to 29° F. within thirty minutes of immersion without freezing, and then removing the fish from the solution.

2. The method of chilling fish to preserve them in prime fresh condition which includes immersing fresh fish in a flowing 80% salt solution at a temperature between 12° F. and 15° F. until the fish attain a subsurface temperature of 27° F. to 29° F. without freezing, and removing the fish from the solution.

3. The method of chilling fish to preserve them in prime fresh condition which includes immersing fresh fish in a flowing salt solution at a temperature greater than that at which free ice crystals will form and low enough to reduce the temperature of the fish to approximately 28° F. within thirty minutes without freezing the fish.

In testimony whereof, we have signed our names to this specification this fifth day of August, 1920.

ARTHUR C. EATON.
WILLIAM R. CAMERON.